US012354539B2

(12) United States Patent
Kim

(10) Patent No.: US 12,354,539 B2
(45) Date of Patent: Jul. 8, 2025

(54) DISPLAY APPARATUS FOR USE IN VEHICLE AND CONTROL METHOD THEREFOR

(71) Applicant: HYUNDAI MOBIS CO., LTD., Seoul (KR)

(72) Inventor: Shin Yeong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/630,389

(22) Filed: Apr. 9, 2024

(65) Prior Publication Data

US 2024/0363063 A1 Oct. 31, 2024

(30) Foreign Application Priority Data

Apr. 25, 2023 (KR) ........................ 10-2023-0054298
May 16, 2023 (KR) ........................ 10-2023-0063114

(51) Int. Cl.
*G09G 3/3208* (2016.01)

(52) U.S. Cl.
CPC ... *G09G 3/3208* (2013.01); *G09G 2320/0257* (2013.01); *G09G 2320/041* (2013.01); *G09G 2320/046* (2013.01); *G09G 2320/0626* (2013.01); *G09G 2320/0686* (2013.01); *G09G 2320/0693* (2013.01); *G09G 2380/10* (2013.01)

(58) Field of Classification Search
None
See application file for complete search history.

(56) References Cited

U.S. PATENT DOCUMENTS 6,411,306 B1 * 6/2002 Miller ........................ G09G 5/10 348/602
6,483,245 B1 * 11/2002 Weindorf ................. G09G 3/00 315/159
6,912,664 B2 * 6/2005 Ranganathan ........ G06F 3/1431 345/98
7,102,632 B2 * 9/2006 Siwinski .............. G09G 3/3225 345/212

(Continued)

*Primary Examiner* — Fred Tzeng
(74) *Attorney, Agent, or Firm* — Morgan, Lewis & Bockius LLP

(57) ABSTRACT

A display device including, a display panel including a plurality of pixels on a front surface; a housing including a housing opening through which the display panel enters or exits; a first sensor unit configured to sense a temperature of the display panel; a second sensor unit configured to sense an internal temperature of the housing; a pixel sensing unit configured to sense an active area in which the plurality of pixels are in an active state and an inactive area in which the plurality of pixels are in an inactive state; a functional status calculation unit configured to calculate a functional status of each of the plurality of pixels on the basis of information received from the first sensor unit, the second sensor unit, and the pixel sensing unit; a weight calculation unit configured to calculate a function weight on the basis of functional status of each of the plurality of pixels and calibrate a lifespan of each of the plurality of pixels on the basis of the calculated function weight; and a pixel calibration unit configured to calibrate luminance of the plurality of pixels and calibrate color between the plurality of pixels.

19 Claims, 9 Drawing Sheets

(56) References Cited

U.S. PATENT DOCUMENTS

| | | | | |
|---|---|---|---|---|
| 7,184,067 | B2 * | 2/2007 | Miller | H10K 59/351 345/694 |
| 7,312,771 | B2 * | 12/2007 | Iwamura | G09G 5/02 345/76 |
| 7,545,349 | B2 * | 6/2009 | Yamada | G09G 3/3208 345/76 |
| 7,580,033 | B2 * | 8/2009 | Plut | G09G 5/00 345/212 |
| 7,839,361 | B2 * | 11/2010 | Lee | G09G 3/3233 315/169.3 |
| 10,217,418 | B2 * | 2/2019 | Kim | G09G 3/3233 |
| 10,242,623 | B2 * | 3/2019 | Han | G09G 3/3233 |
| 11,605,344 | B2 * | 3/2023 | Yuan | G09G 3/3233 |
| 11,881,185 | B2 * | 1/2024 | Yu | G09G 3/36 |
| 12,112,688 | B2 * | 10/2024 | Kwon | G09G 3/3233 |
| 2004/0222951 | A1 * | 11/2004 | Lee | G09G 3/3208 345/77 |
| 2017/0345378 | A1 * | 11/2017 | Ryu | G09G 3/3233 |
| 2018/0151117 | A1 * | 5/2018 | Choi | G09G 3/3225 |
| 2021/0104196 | A1 * | 4/2021 | Yuan | G09G 3/3266 |
| 2023/0074524 | A1 * | 3/2023 | Peng | G09G 3/2014 |
| 2024/0005850 | A1 * | 1/2024 | Jang | G09G 3/32 |

* cited by examiner

DISPLAY APPARATUS FOR USE IN VEHICLE AND CONTROL METHOD THEREFOR

CROSS-REFERENCE OF RELATED APPLICATIONS

The present application claims priority to Patent Applications No. 10-2023-0054298, filed on Apr. 25, 2023 in Korea, and No. 10-2023-0063114, filed on May 16, 2023 in Korea the entire contents of which are incorporated herein by reference.

TECHNICAL FIELD

The present disclosure relates to a display device and control method.

BACKGROUND

The content described in this section simply provides background information for the present disclosure and does not constitute related art.

A display may be configured using an organic light emitting diode (OLED). The OLED has a panel issue called burn-in phenomenon. Here, the burn-in phenomenon occurs when some pixels on a display panel continuously display the same image. Brightness of each pixel in the OLED decreases when an image is continuously displayed. Therefore, in the related art, luminance of the display panel is adjusted and a lifespan of the display panel is managed on the basis of a temperature of the display panel and a driving ratio of the pixels. Here, the driving ratio refers to a ratio of areas divided according to an active state of pixels on the display panel or an inactive state of the pixels on the display panel.

In a rollable display and/or a slidable display, a size of a screen on which a display panel is exposed is adjusted when the display is used. When the size of the screen on which the display panel is exposed is adjusted, a partial area of the display panel is rolled down in a housing. The rolled-down area of the display panel has residual heat that has been generated at the time of exposure even though pixels are not driven. The rolled-down area of the display panel changes an internal temperature of the housing. In the rolled-down area, heat is not effectively dissipated as the internal temperature of the housing increases. Therefore, burn-in may rapidly occur in the rolled-down area. Further, in the rolled-down area, a border area adjacent to the exposed area on the display panel requires accurate lifespan management because the border area is affected by a temperature of the exposed area.

A flexible display has a problem that the flexible display is easily damaged by an external force. The flexible display is exposed to a user by being unrolled or slid from inside of a housing. For example, when there is an object within an exposure range of the flexible display, the flexible display may be damaged due to contact with the object while moving.

When the flexible display malfunctions, it is difficult to determine whether the malfunction is due to an internal defect of the display device or due to an external force transferred from the outside of the display device.

SUMMARY

A display device and a control method according to an embodiment can manage lifespans of the plurality of pixels by sensing a temperature at each position on a display panel.

A display device and a control method according to an embodiment can calibrate luminance and color of a display panel on the basis of a position value of an inactive area and a temperature of the inactive area on the display panel.

A display device and a control method according to an embodiment can calibrate luminance and color of a display panel on the basis of an internal temperature of a housing.

A display device and a control method according to an embodiment can calibrate a lifespan of a display panel on the basis of an area with a largest function decline on the display panel or one pixel with a largest function decline among a plurality of pixels on the display panel.

A display device according to another embodiment can determine whether there is an internal defect of a display panel or an external force and send a corresponding warning message to a user.

A display device according to another embodiment can protect a display panel from a damage risk and maintain repairability.

The problems to be solved by the present invention are not limited to the problems mentioned above, and other problems not mentioned will be clearly understood by those skilled in the art from the description below.

According to an embodiment, the display device and the control method have an effect that it is possible to manage lifespans of the plurality of pixels by sensing a temperature at each position on a display panel.

According to an embodiment, the display device and the control method have an effect that it is possible to calibrate luminance and color of a display panel on the basis of a position value of an inactive area and a temperature of the inactive area on the display panel.

According to an embodiment, the display device and the control method have an effect that it is possible to calibrate luminance and color of a display panel on the basis of an internal temperature of a housing.

According to an embodiment, the display device and the control method have an effect that it is possible to calibrate a lifespan of a display panel on the basis of an area with a largest function decline on the display panel or one pixel with a largest function decline among a plurality of pixels on the display panel.

According to another embodiment, the display device has an effect that it is possible to determine whether there is an internal defect of a display panel or an external force and send a corresponding warning message to a user.

According to another embodiment, the display device has an effect that it is possible to protect a display panel from a damage risk and maintain repairability.

DETAILED DESCRIPTION

Figure 1:
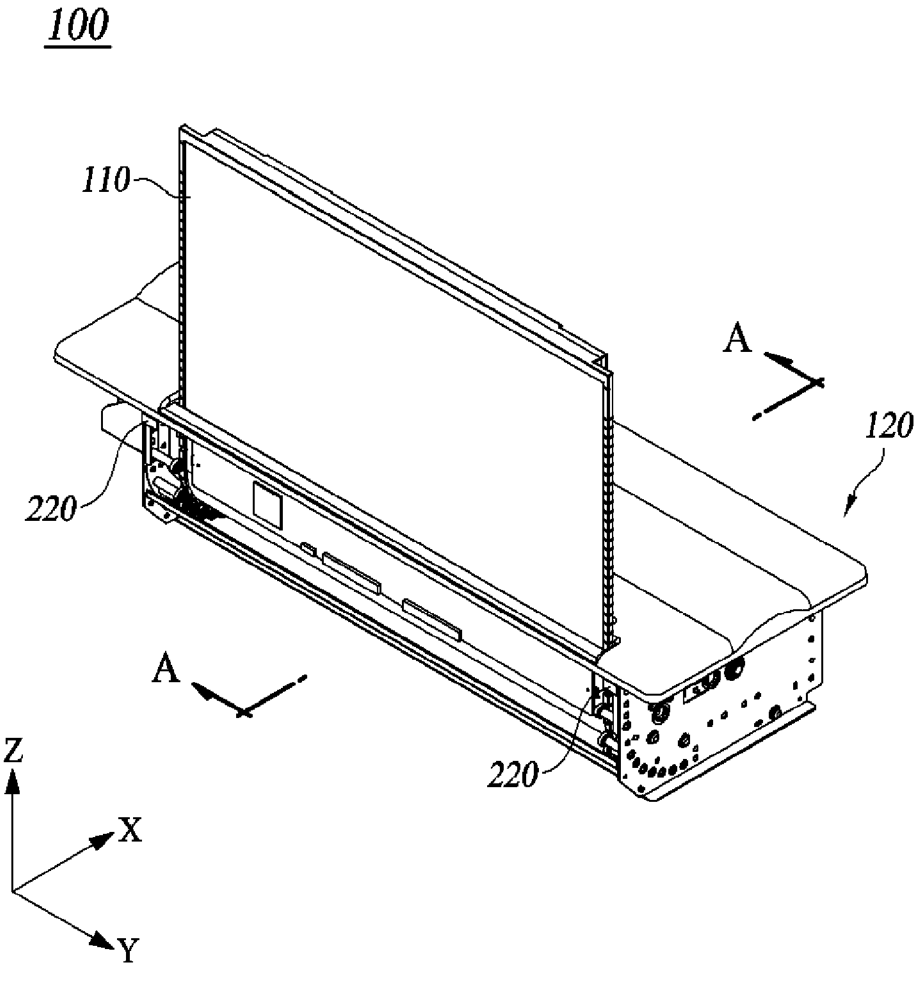
FIG. 1 is a perspective view illustrating a display device according to an embodiment of the present invention.

FIG. 1 is a perspective view illustrating a display device according to an embodiment of the present invention.

Figure 2:
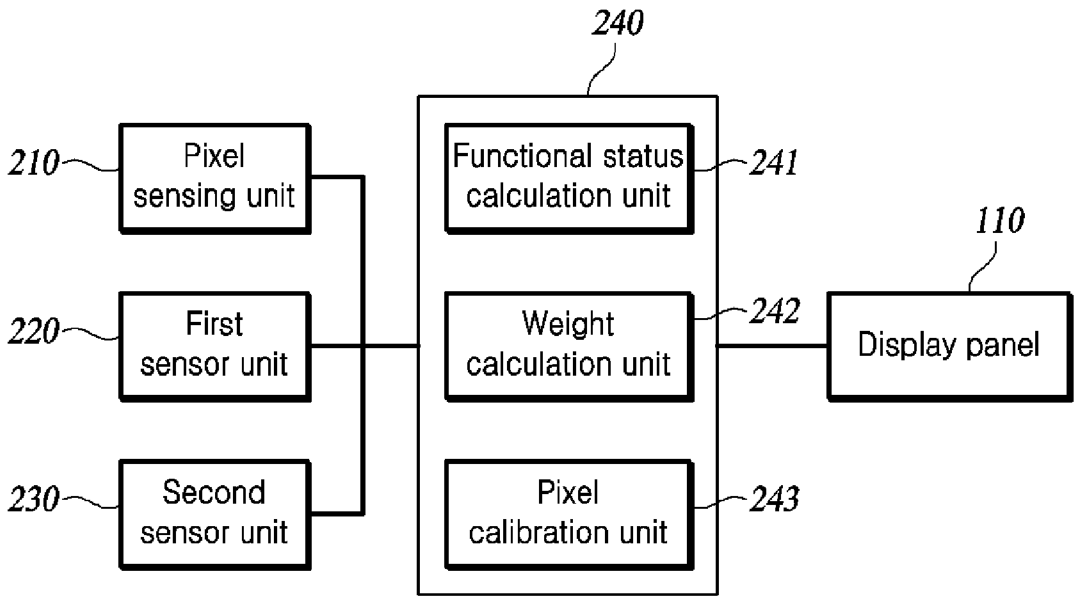
FIG. 2 is a block configuration diagram illustrating a configuration of the display device according to the embodiment of the present invention.

FIG. 2 is a block configuration diagram illustrating a configuration of the display device according to the embodiment of the present invention.

Figure 3:
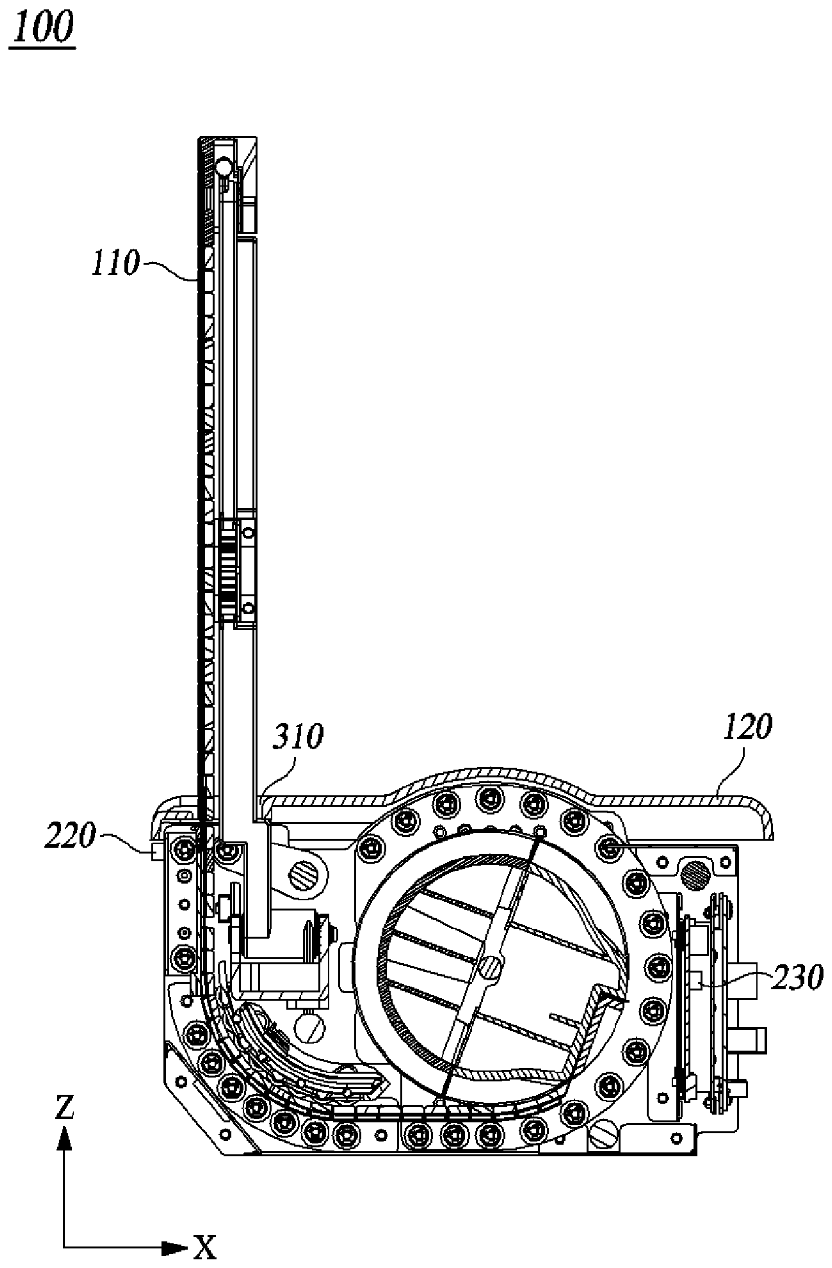
FIG. 3 is a cross-sectional view taken along line A-A of FIG. 1.

FIG. 3 is a cross-sectional view taken along line A-A of FIG. 1.

Figure 4:
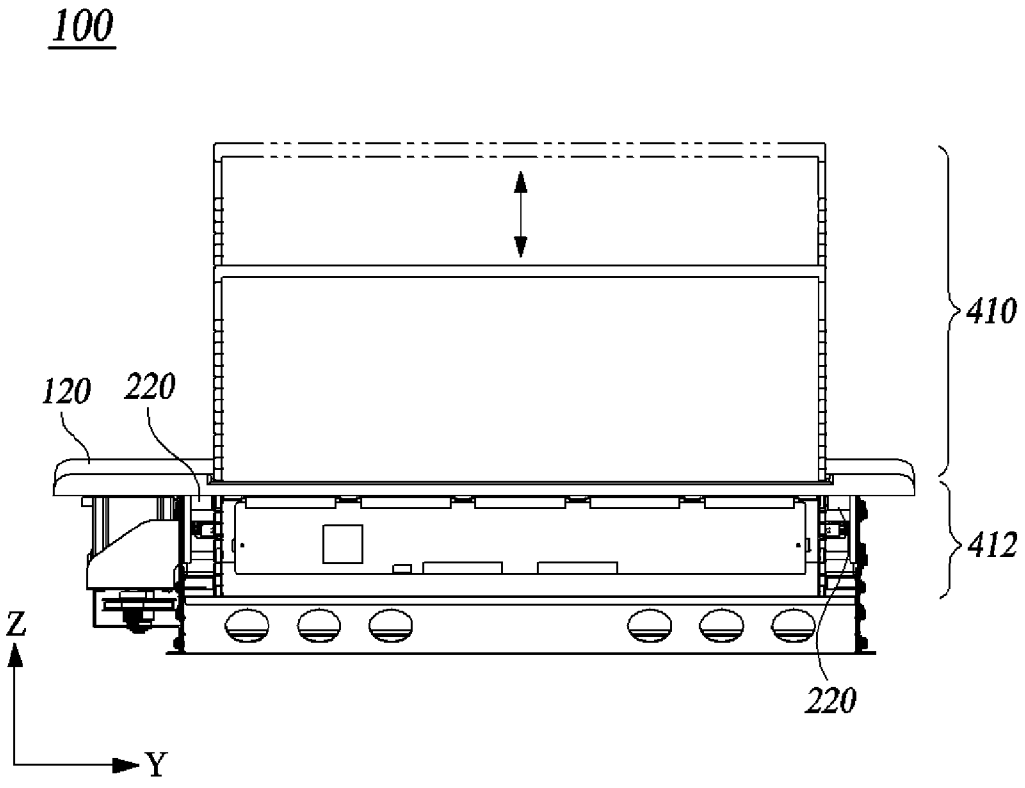
FIG. 4 is a diagram illustrating an example of driving according to an active state and an inactive state of the display panel.

FIG. 4 is a diagram illustrating an example of driving according to an active state and an inactive state of the display panel.

Referring to FIGS. 1 to 4, a display device 100 includes some or all of a display panel 110, a housing 120, a first sensor unit 220, a second sensor unit 230, and a display control unit 240.

The housing 120 includes a housing opening 310 through which the display panel 110 enters or exits. The housing opening 310 is open in a z-axis direction with a top surface of the housing 120 as a reference.

The display panel 110 may cause only pixels in a portion exposed to the outside of the housing 120 to emit light. Here, the exposed portion of the display panel 110 provides a display image to a user. A non-exposed portion of the display panel 110 enters the housing 120 through a scheme such as rolling. The display panel 110 includes a plurality of pixels (not illustrated). Each of the plurality of pixels operates independently.

There may be a plurality of first sensor units 220. The first sensor unit 220 may be disposed on both sides of the display panel 110. The first sensor unit 220 may be a temperature sensor that measures a front surface temperature of an inactive area 412 on the display panel 110. Accordingly, after the display panel 110 enters the housing 120, the first sensor unit 220 measures a temperature of the inactive area 412 on the display panel 110, that is, an area of pixels that does not emit light. The first sensor unit 220 may be disposed adjacent to the housing opening 310. Specifically, the first sensor unit 220 may be disposed adjacent to the housing opening 310 to measure a temperature of a front surface of the inactive area 412 on the display panel 110 entering the housing 120, in an active area 410 on the display panel 110, that is, in an area in which a display is being performed.

The second sensor unit 230 may be a temperature sensor that measures an internal temperature of the housing 120. Here, the internal temperature is a temperature of the air inside the housing 120. The second sensor unit 230 may be disposed at any one place inside the housing 120. In FIG. 3, the second sensor unit 230 is shown as being disposed on a rear side of the housing 120, but is not limited thereto. A position of the second sensor unit 230 is preferably disposed at a predetermined distance away from the display panel 110 not to be affected by a temperature of the active area 410 on the display panel 110.

The second sensor unit 230 may include a plurality of temperature sensors. The second sensor unit 230 may be disposed at a plurality of positions inside the housing 120 to measure an internal temperature of the housing 120. The display control unit 240 may estimate an average internal temperature value of the housing 120 using the second sensor unit 230.

When the active area 410 of the display panel 110 is, for example, 100%, the display panel 110 is in a full screen mode. When the display panel 110 is in the full screen mode, all pixels on the display panel 110 are in the active state. When the active area 410 of the display panel 110 is changed from 100% to 70%, for example, 30% of the display panel 110 becomes the inactive area 412. Here, the inactive area 412 enters the housing 120. After the inactive area 412 enters the housing 120, the internal temperature of the housing 120 increases because of residual heat generated in the active state. Accordingly, the first sensor unit 220 is preferably disposed at a position at which a transition from the active area 410 to the inactive area 412 on the display panel 110 occurs.

The display control unit 240 includes some or all of a functional status calculation unit 241, a weight calculation unit 242, and a pixel calibration unit 243, which. individually or together, may be implemented by a processor.

The display control unit 240 may receive the front surface temperature value of the display panel 110 from the first sensor unit 220. The display control unit 240 may receive the internal temperature value of the housing 120 from the second sensor unit 230.

The display control unit 240 may determine lifespans of the plurality of pixels on the basis of display information received from the first sensor unit 220 and the second sensor unit 230. Here, the display information includes pixel position information, first temperature information, and second temperature information. The position information of the pixel includes a position value of the inactive area 412. The first temperature information includes a temperature value of the inactive area 412 in the plurality of pixels. The second temperature information includes the internal temperature value of the housing 120.

The display control unit 240 may calculate the lifespans of the plurality of pixels and then calibrate the lifespans of all pixels formed on the display panel 110 on the basis of the lifespan of at least one pixel with a shortest lifespan among the plurality of pixels. The display control unit 240 may calibrate the lifespans of all the pixels formed on the display panel 110 on the basis of a lifespan of an area with a shortest lifespan on the display panel 110.

A pixel sensing unit 210, implemented by, for example, a circuit, may sense an active sate and an inactive state of each of the plurality of pixels. In other words, the pixel sensing unit 210 may distinguish between the active area 410 and the inactive area 412 on the display panel 110. The pixel sensing unit 210 may sense a position value of an area on the display panel 110 entering or exiting the housing opening 310. For example, the pixel sensing unit 210 may measure a current supplied to each pixel and determine whether each pixel is active or inactive on the basis of a current value. Accordingly, the pixel sensing unit 210 may estimate the position value of the pixel in the active state or the pixel in the inactive state among the plurality of pixels.

The functional status calculation unit 241 may calculate a functional status of each of the plurality of pixels on the basis of the display information received from the pixel sensing unit 210, the first sensor unit 220, and the second sensor unit 230.

The weight calculation unit 242 may assign a function weight to the inactive area 412 on the display using at least one of pixel position information, first temperature information, and second temperature information. Here, the function weight is a weight for the lifespans of the plurality of pixels.

The weight calculation unit 242 may distinguish the function weight between the plurality of pixels or assign the function weight to each pixel. For example, the weight calculation unit 242 may assign a function weight in proportion to a distance of the inactive areas 412 adjacent to the active area 410. For example, a temperature of the active area 410 on the display panel 110 is higher than that of the inactive area 412 on the display panel 110 because the plurality of pixels emit heat. Accordingly, an area of the inactive area 412 on the display panel 110 close to the active area 410 is affected by the heat emitted from the active area 410. Accordingly, the weight calculation unit 242 may assign a larger function weight to the area of the inactive area 412 close to the active area 410.

The weight calculation unit 242 may assign a function weight to the inactive area 412 of the plurality of pixels on the basis of the first temperature information. This is because, as the first temperature information is higher, the temperature of the inactive area 412 whose temperature is measured by the first sensor unit 220 is higher.

The weight calculation unit 242 may assign a function weight proportional to the second temperature information to the inactive area 412, in which the temperature is measured by the first sensor unit 220. For example, this is because, as the internal temperature of the housing 120 increases, the temperature of the inactive area 412 on the display panel 110 increases. When the temperature of the inactive area 412 increases, the lifespan of the pixel disposed in the inactive area 412 may decrease.

The pixel calibration unit 243 may calibrate luminance of the plurality of pixels with one pixel with a largest function decline among the plurality of pixels or an area with a largest function decline on the display panel 110 as a reference on the basis of the lifespans of the plurality of pixels calculated by the functional status calculation unit 241. The pixel calibration unit 243 may calibrate colors of the plurality of pixels.

When the pixel calibration unit 243 calibrates the luminance of the entire display panel 110, the pixel calibration unit 243 may remove an afterimage of the inactive area 412 of the plurality of pixels and calibrate life uniformity of the display panel 110.

Figure 5:
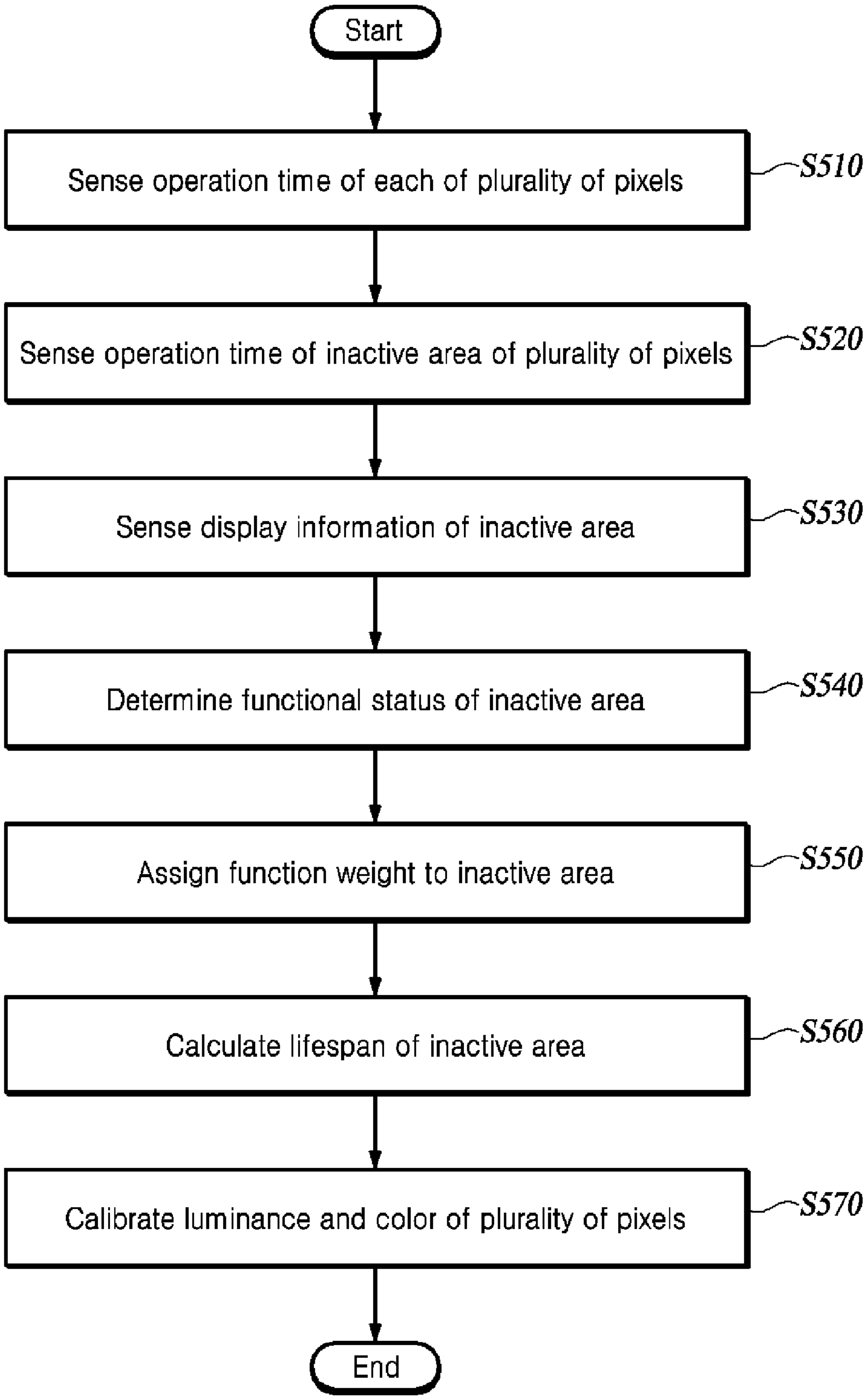
FIG. 5 is a flowchart illustrating a control method for a display device according to an embodiment of the present invention.

FIG. 5 is a flowchart illustrating a control method for a display device according to an embodiment of the present invention.

Referring to FIG. 5, the pixel sensing unit 210 senses an operation time of each of the plurality of pixels on the display panel 110 (S510).

After a portion of the display panel 110 enters the housing 120, the pixel sensing unit 210 senses an operation time of the inactive area 412 of the plurality of pixels (S520). The pixel sensing unit 210 may measure the position values of the active area 410 and the inactive area 412 of the plurality of pixels on the display panel 110 and sense the operation time.

Display information of the inactive area 412 of the plurality of pixels is sensed (S530). The display control unit 240 may receive the display information of the inactive area 412. The display control unit 240 may receive the display information from the pixel sensing unit 210, the first sensor unit 220, and the second sensor unit 230.

The functional status of the inactive area 412 is determined on the basis of the display information (S540). The functional status calculation unit 241 may calculate the functional status of the inactive area 412.

A function weight is assigned to the inactive area 412 on the basis of the functional status of the plurality of pixels (S550). The weight calculation unit 242 assigns a function weight on the basis of the functional status of the inactive area 412.

After the function weights are assigned to the plurality of pixels, the lifespan of the inactive area 412 is calculated (S560). After the function weights are assigned to the plurality of pixels, the display control unit 240 may calculate the lifespan of the inactive area 412.

The luminance and color of the plurality of pixels are calibrated (S570). When the pixel calibration unit 243 calibrates the luminance and color of the plurality of pixels, the pixel calibration unit 243 calibrates the luminance and color of the plurality of pixels on the basis of the pixel with a largest lifespan decline among the plurality of pixels or an area with a largest lifespan decline on the display panel 110.

Figure 6:
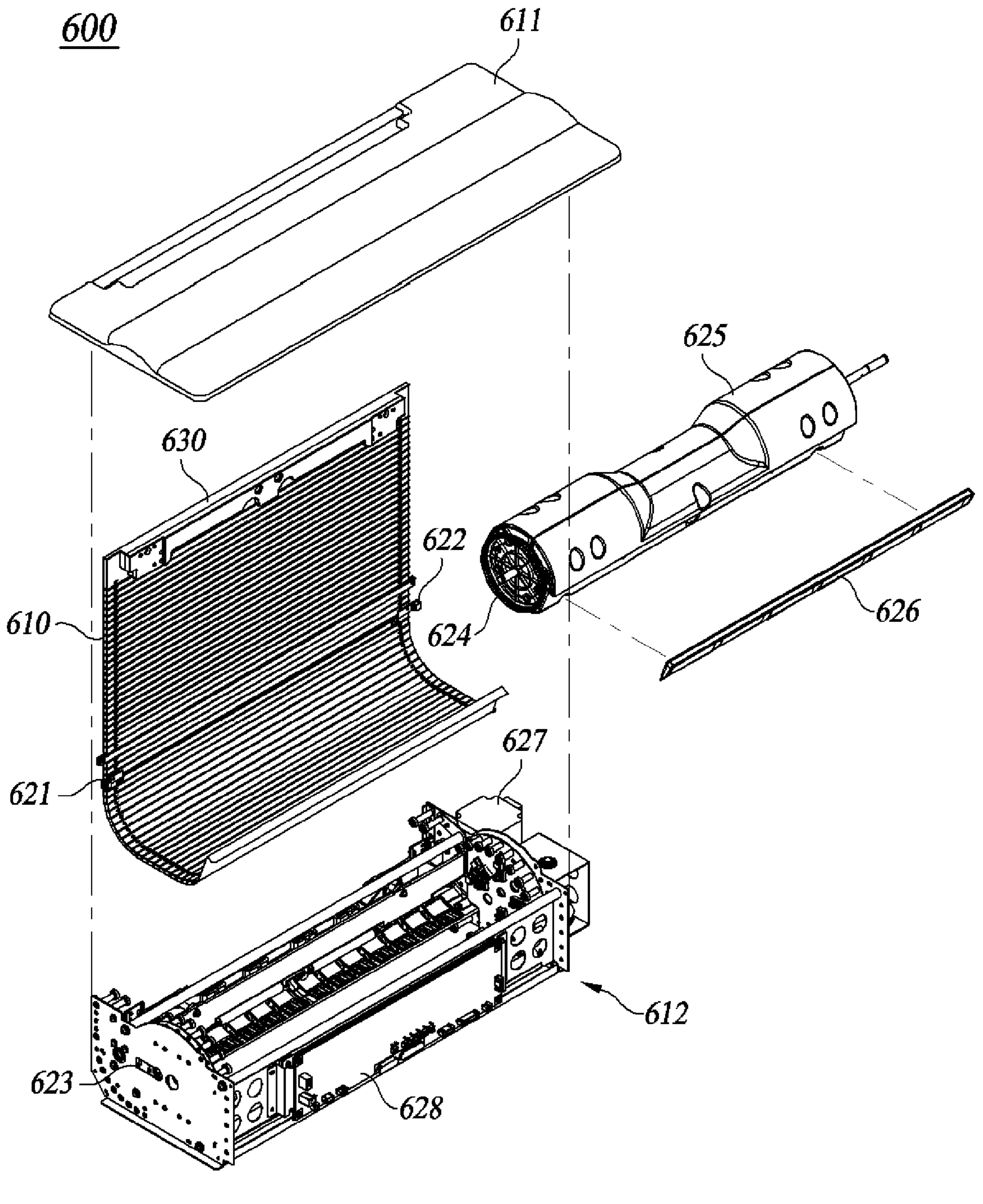
FIG. 6 is a perspective view illustrating a configuration of a display device according to another embodiment of the present invention.

FIG. 6 is a perspective view illustrating a configuration of a display device according to another embodiment of the present invention.

Figure 7:
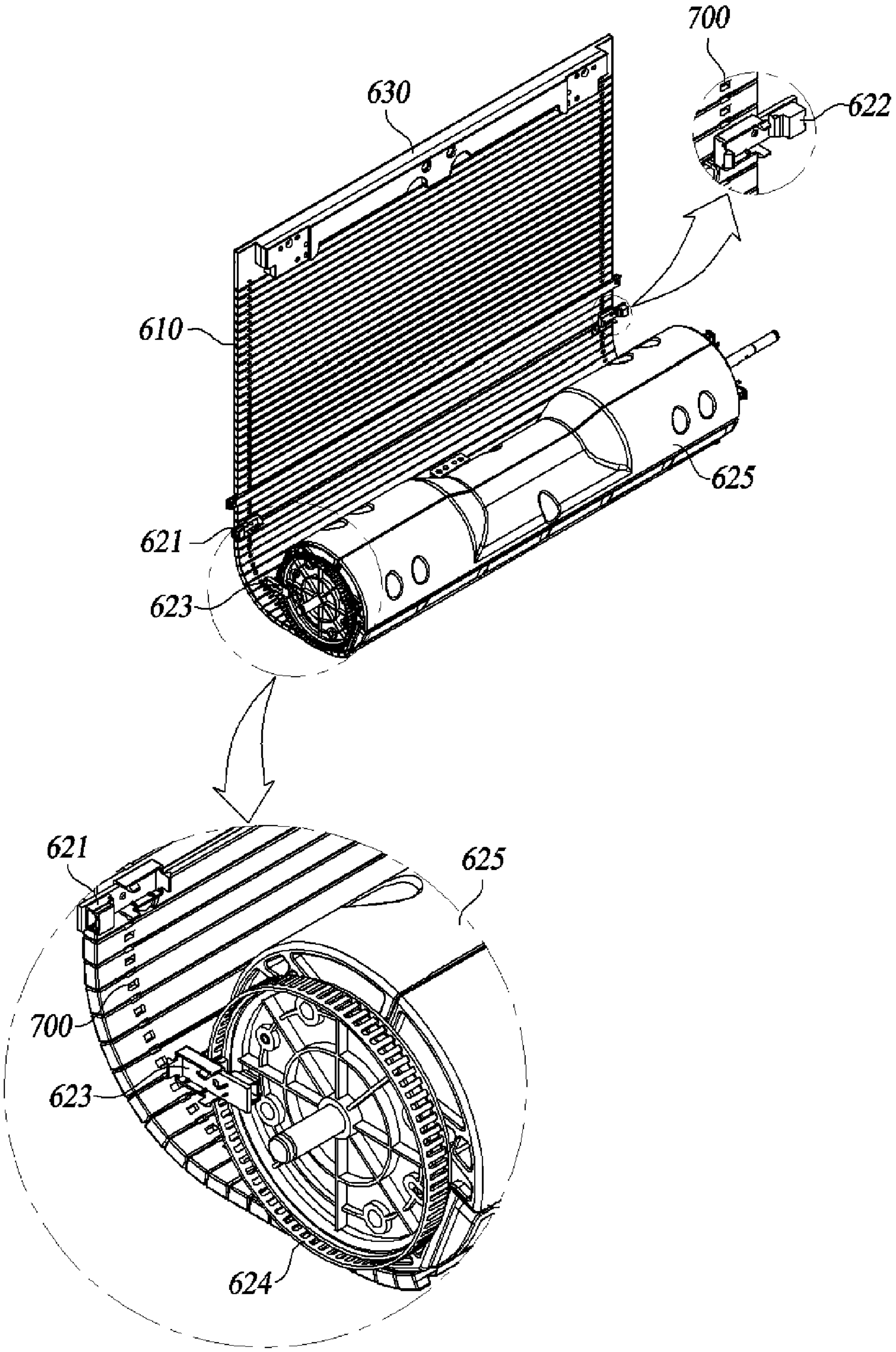
FIG. 7 is a partially enlarged view illustrating the third sensor unit, the fourth sensor unit, and the fifth sensor unit in detail according to another embodiment of the present disclosure.

FIG. 7 is a partially enlarged view illustrating the third sensor unit, the fourth sensor unit, and the fifth sensor unit in detail according to another embodiment of the present disclosure.

Referring to FIGS. 6 and 7, the display device 600 includes some or all of a display panel 610, a housing 612, third sensor units 621 and 622, a fourth sensor unit 623, and a fifth sensor unit 630.

The display panel 610 may include a rollable display or a slidable display. The display panel 610 is rolled around a cylindrical member 625 disposed inside the housing 612. The cylindrical member 625 rotates on the basis of a rotational force of a motor 127. The motor 127 generates the rotational force to rotate the cylindrical member 625, and the cylindrical member 625 rotates so that the display panel 610 can move. Here, the movement includes horizontal or vertical movement and rolling or unrolling operations. The rolling operation is an operation in which the display panel 610 is rolled around the cylindrical member 625 and is moved into the housing 612. The unrolling operation is an operation in which the display panel 610 moves to the outside of the housing 612. A guide member 626 may be disposed near the cylindrical member 625. The guide member 626 may move the display panel 610 without interference with the display panel 610 when the display panel 610 is rolled or when the display panel 610 is exposed to the outside of the housing 612.

The third sensor units 621 and 622 are disposed on a rear surface of the display panel 610. The third sensor units 621 and 622 include a third sensor 621 and a fourth sensor 622. The third sensor 621 and the fourth sensor 622 may be photo sensors.

The third sensor 621 and the fourth sensor 622 may be disposed at the same height on the rear surface of the display panel 610. The third sensor 621 is disposed on one side of the display panel 610, and the fourth sensor 622 is disposed on the other side of the display panel 610. The third sensor 621 and the fourth sensor 622 may sense a plurality of grooves 700 formed on the rear surface of the display panel 610. Here, the plurality of grooves 700 are formed at regular intervals with a movement direction of the display panel 610 as a reference. When the display panel 610 moves, the third sensor 621 and the fourth sensor 622 may measure some or all of the plurality of grooves 700. Accordingly, the third sensor 621 and the fourth sensor 622 may obtain information on the movement direction and current position of the display panel 610.

For the third sensor units 621 and 622 according to another embodiment of the present invention, hall sensors may be used. The display panel 610 according to another embodiment of the present invention may include a plurality of magnets disposed at regular intervals on the rear side in the movement direction of the display panel 610. The hall sensor may measure the number of magnets and the movement directions of the magnets.

The fourth sensor unit 623 measures a rotation value of the cylindrical member 625. The fourth sensor unit 623 is disposed adjacent to the cylindrical member 625. Specifically, a slot disk 624 is coupled to one side of the cylindrical member 625. The slot disk 624 includes slots formed at regular intervals on an outer peripheral surface. When the slot disk 624 rotates, the fourth sensor unit 623 may measure the rotation value of the cylindrical member 625 by counting the slots. The fourth sensor unit 623 may be a photo interrupter.

The fifth sensor unit 630 is disposed at an upper end of the display panel 610. The fifth sensor unit 630 may be a proximity sensor module. The fifth sensor unit 630 may determine the presence or absence of an object at the top of the display panel 610. The fifth sensor unit 630 may determine the presence or absence of an external force at the top of the display panel 610. For example, when the display panel 610 moves and is exposed and an object is within an exposure range of the display panel 610, the display panel 610 may be damaged. Accordingly, the fifth sensor unit 630 may determine the presence or absence of an object or external force within the exposure range of the display panel 610.

The display device 600 further includes a control unit (not illustrated). The control unit may be disposed on the PCB 628 inside the display device 600. The control unit may be an electronic control unit. The control unit may determine whether or not the balance of the display panel 610 is maintained on the basis of information on the movement direction of the display panel 610 and the current position of the display panel 610 measured by the third sensor 621 and the fourth sensor 622. For example, the control unit may determine whether or not the balance of the display panel 610 is maintained by comparing the number of grooves measured by the third sensor 621 and the fourth sensor 622. When the number of grooves measured by the third sensor 621 and the fourth sensor 622 are different, the control unit may determine that the balance of the display panel 610 is not maintained.

The control unit may compare the movement value of the display panel 610 measured by the third sensor units 621 and 622 with the rotation value of the cylindrical member 625 measured by the fourth sensor unit 623. This is because the movement value of the display panel 610 is the same as the rotation value of the cylindrical member 625. Accordingly, the control unit may determine whether the display panel 610 is malfunctioning using the third sensor units 621 and 622 and the fourth sensor unit 623.

Figure 8:
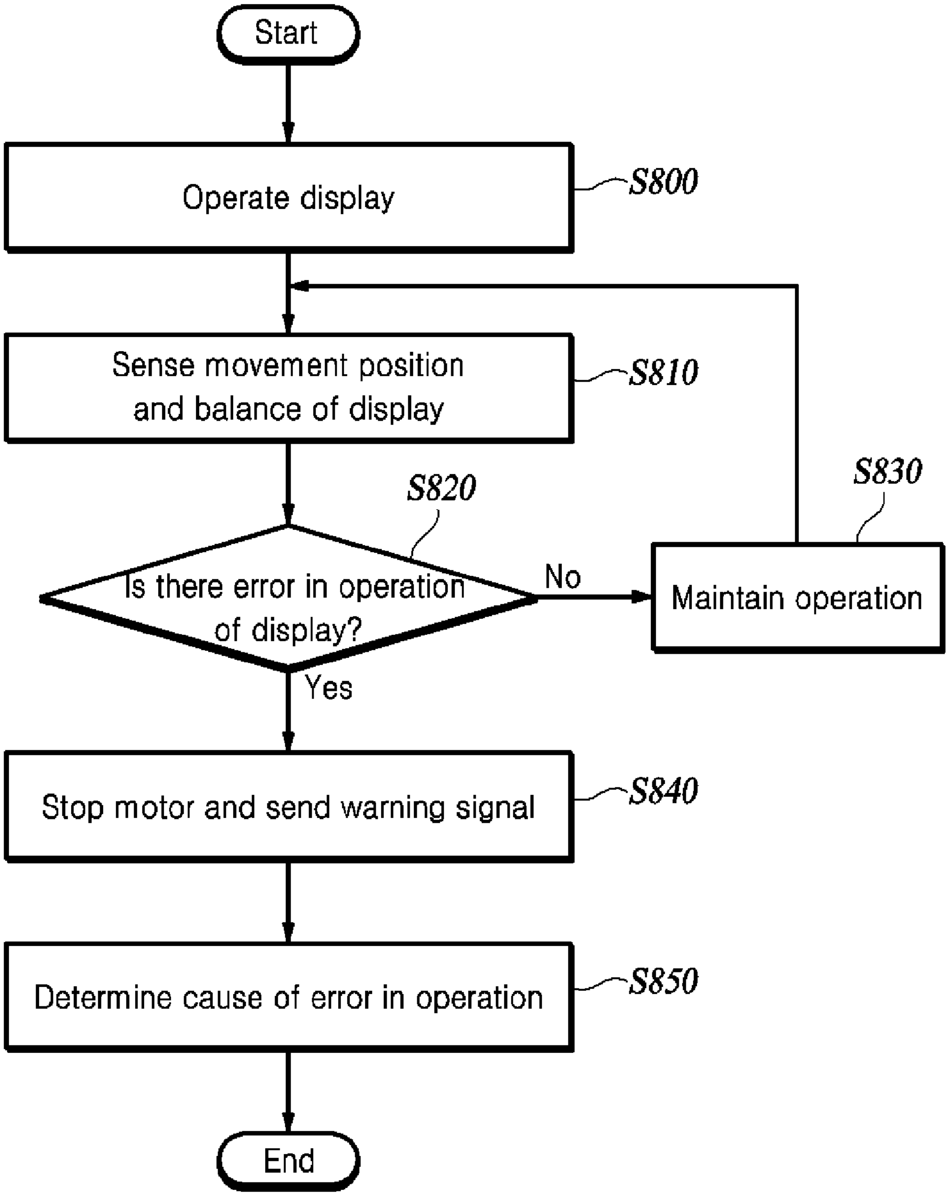
FIG. 8 is a flowchart illustrating a display control method according to another embodiment of the present disclosure.

FIG. 8 is a flowchart illustrating a display control method according to another embodiment of the present disclosure.

The display panel 610 is operated by being unrolled to the outside of the housing 612 or rolled into the housing 612 (S800). The display panel 610 may be exposed to the outside of the housing 612. In the display device 600 according to an embodiment of the present invention, the display panel 610 may be rolled and exposed to the outside of the housing 612. Here, the display panel 610 may be exposed upward with the upper case 611 as a reference.

The current position and the balance of the display panel 610 are sensed (S810). When the display panel 610 moves, the third sensor units 621 and 622 may use the third sensor 621 and the fourth sensor 622 to sense the current position of the display panel 610 and the balance of the display panel 610. Here, the current position of the display panel 610 means moving toward the outside of the housing 612 (rolling out) or moving toward the inside of the housing 612 (rolling in). The third sensor 621 and the fourth sensor 622 may sense the balance of the display panel 610 by sensing the plurality of grooves 700 formed on the rear side of the display panel 610. The fourth sensor unit 623 may measure a rotation value of the slot disk 624.

A determination is made as to whether there is an error in an operation of the display panel 610 (S820). The control unit may determine whether there is an error in the operation of the display panel 610 on the basis of the movement value of the display panel 610 and the rotation value of the slot disk 624. For example, when the movement values of the display panel 610 measured by the third sensor 621 and the fourth sensor 622 are different from each other, a determination may be made that the display panel 610 is tilted to one side and moved. When the movement value of the display panel 610 measured by the third sensor units 621 and 622 is different from the rotation value of the slot disk 624 measured by the fourth sensor unit 623, a determination may be made that there is an error in the operation of the display panel 610.

When a determination is made in step S820 that there is no error in the operation of the display panel 610, the operation of the display panel 610 is maintained (S830).

When a determination is made in step S820 that there is an error in the operation of the display panel 610, the motor 127 is stopped and a warning signal is sent (S840). The motor 127 may be disposed on one side of the cylindrical member 625. The motor 127 may be disposed on the other side of the cylindrical member 625 at which the slot disk 624 is disposed, with the cylindrical member 625 as a reference. The motor 127 may rotate the cylindrical member 625 using gears, belt, or the like. When a determination is made that there is an error in the operation of the display panel 610, the control unit may stop driving the motor 127 to prevent damage to the display panel 610.

A cause of the error in an operation of the display panel 610 is determined (S850). The control unit may determine whether a cause of the error in the operation of the display panel 610 is an operation error caused by a defect inside the display device 600 or an operation error caused by an external force from the outside of the display device 600. Step S850 will be described in detail with reference to FIG. 9.

Figure 9:
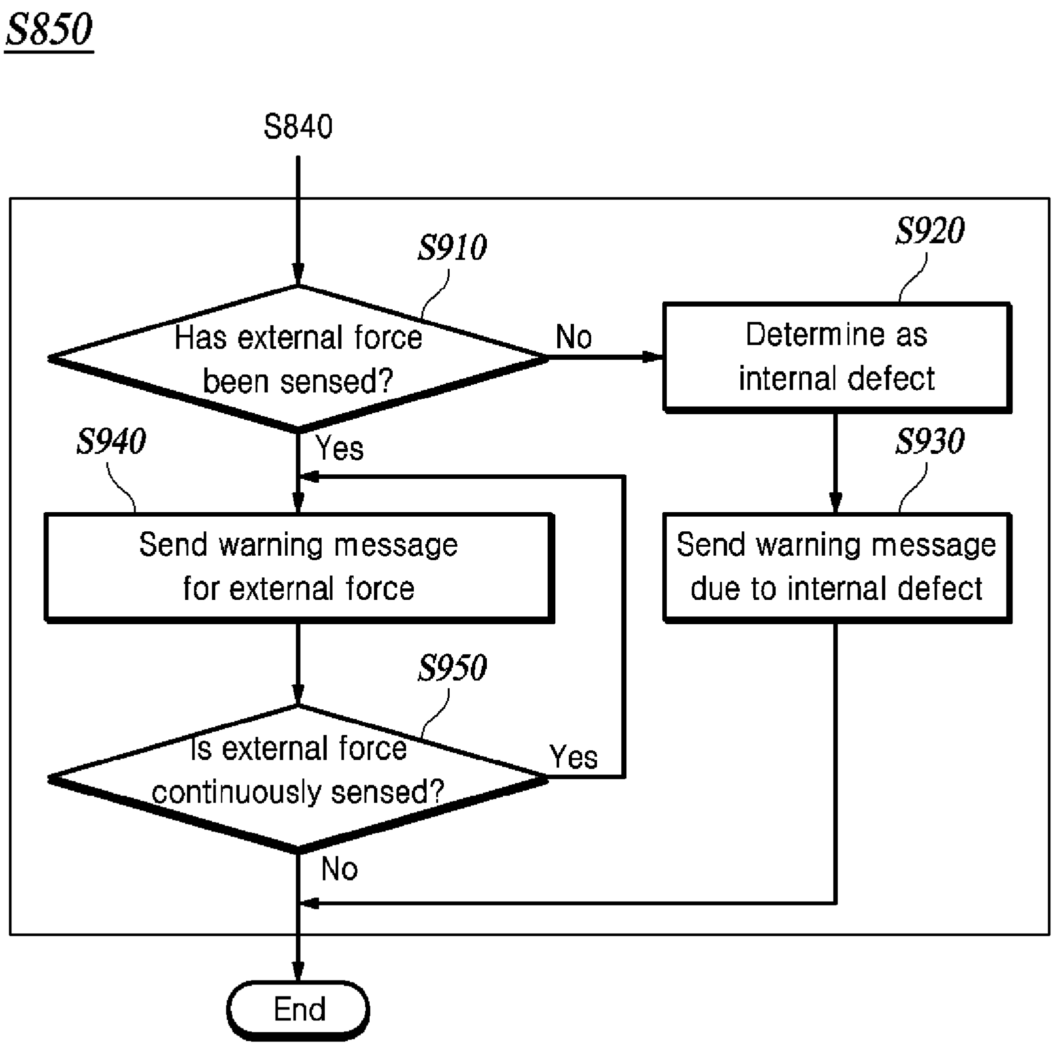
FIG. 9 is a flowchart illustrating step S850 of FIG. 8 in detail.

FIG. 9 is a flowchart illustrating step S850 of FIG. 8 in detail.

Referring to FIG. 9, a determination is made as to whether an external force has been sensed (S910). The fifth sensor unit 630 may sense an external force or object from a upward direction of the display panel 610. The fifth sensor unit 630 may determine the presence or absence of an object located within the exposure range of the display panel 610.

When a determination is made in step S910 that no external force is sensed, a determination is made that the operation error has occurred due to the internal defect of the display device 600 (S920). When the fifth sensor unit 630 measures that there is no external force or object from the upward direction of the display device 600, the control unit determines that the malfunction is not caused by the external force or object. That is, a determination may be made that the malfunction has occurred due to the internal defect of the display device 600.

A warning message due to the internal defect is sent (S930). When the control unit determines in step S920 that the malfunction has occurred due to the internal defect of the display device 600, the control unit sends the warning message due to the internal defect. Here, the warning message may be sent to the user using an audio output device or the like included inside the vehicle.

When a determination is made in step S910 that an external force has been sensed, a warning message for an external force is sent (S940). When the fifth sensor unit 630 measures the external force and the control unit determines that the external force from the upward direction of the display device 600 is sensed, the warning message for an external force is sent. Here, for the warning message for an external force, for example, a guidance message such as "There is concern about damage to the display" and "Please remove objects around the display" may be sent using the audio output device or the like included inside the vehicle.

A determination is made as to whether an external force is continuously sensed (S950). The control unit may continuously receive information on whether an external force is sensed from the fifth sensor unit 630.

In step S950, when a determination is made that an external force is continuously sensed, a warning message for an external force is continuously sent. When a determination is made that an external force is continuously sensed in the display device 600, the same warning message as in step S940 may be continuously sent.

What is claimed is:

1. A display device comprising:

a display panel including a plurality of pixels on a front surface;

a housing including a housing opening through which the display panel enters or exits;

a first sensor unit configured to sense a temperature of the display panel;

a second sensor unit configured to sense an internal temperature of the housing;

a pixel sensing unit configured to sense an active area in which the plurality of pixels are in an active state and an inactive area in which the plurality of pixels are in an inactive state;

a functional status calculation unit configured to calculate a functional status of each of the plurality of pixels based on information received from the first sensor unit, the second sensor unit, and the pixel sensing unit;

a weight calculation unit configured to calculate a function weight based on functional status of each of the plurality of pixels and calibrate a lifespan of each of the plurality of pixels based on the calculated function weight; and a pixel calibration unit configured to calibrate luminance of the plurality of pixels and calibrate color between the plurality of pixels.

2. The display device of claim 1, wherein, wherein the first sensor unit includes at least two temperature sensors and is disposed adjacent to an opening surface of the housing opening.

3. The display device of claim 1, wherein the second sensor unit includes at least one temperature sensor and is disposed at any one place inside the housing with an opening surface of the housing opening as a reference.

4. The display device of claim 1, wherein the information includes:

pixel position information including a position value of the inactive area of the plurality of pixels;

first temperature information including a temperature value of the inactive area of the plurality of pixels; and second temperature information including an internal temperature value of the housing.

5. The display device of claim 4, wherein the weight calculation unit assigns a larger function weight to an area of the inactive area closer to the active area based on the pixel position information, assigns a function weight to the inactive area based on the first temperature information, and assigns a function weight proportional to the internal temperature value of the second temperature information to the inactive area, and the function weight is a weight for a lifespan of each of the plurality of pixels.

6. The display device of claim 1, wherein the pixel calibration unit calibrates the luminance of the plurality of pixels and the color of the plurality of pixels with one pixel with a largest function decline among the plurality of pixels or a pixel area with a largest function decline on the display panel as a reference.

7. The display device of claim 6, wherein the pixel calibration unit calibrates life uniformity of the display panel.

8. A control method for a display device comprising:

sensing an operation time of each of a plurality of pixels disposed on a display panel;

sensing an operation time of an inactive area of the plurality of pixels after a portion of the display panel enters a housing;

sensing information of the inactive area of the plurality of pixels;

determining a functional status of the inactive area of the plurality of pixels based on the sensed information of the inactive area of the plurality of pixels;

assigning a function weight to the inactive area of the plurality of pixels based on the functional status;

calculating a lifespan of the inactive area of the plurality of pixels based on the function weight; and calibrating luminance of the plurality of pixels and color of the plurality of pixels with one pixel with a largest function decline among the plurality of pixels or a pixel area with a largest function decline on the display panel as a reference.

9. The control method for a display device of claim 8, wherein the assigning of the function weight to the inactive area based on the functional status includes:

assigning the function weight proportional to an area of the inactive area closer to the active area on the display panel;

assigning the function weight based on a temperature value of the inactive area; and assigning the function weight proportional to an internal temperature value of the housing in which the display panel is stored.

10. The control method for a display device of claim 8, wherein the calibrating of the luminance of the plurality of pixels and the color of the plurality of pixels with the one pixel with the largest function decline among the plurality of pixels or the pixel area with the largest function decline on the display panel as the reference includes removing an afterimage of the inactive area and calibrating life uniformity of the plurality of pixels.

11. A display control method comprising:

sensing a position of a display panel and balance of the display panel;

determining whether there is an error in an operation of the display panel;

stopping a motor for driving the display panel and sending a danger signal when the error in the operation of the display panel is determined; and determining a cause of the error in the operation of the display panel.

12. The display control method of claim 11, wherein the determining of whether there is the error in the operation of the display panel includes:

measuring a movement value of the display panel using a third sensor unit;

measuring a rotation value of a cylindrical member on which the display panel is rolled, using a fourth sensor unit; and determining whether balance of the display panel is maintained by comparing the movement value of the display panel with the rotation value of the cylindrical member.

13. The display control method of claim 12, wherein the measuring of the movement value of the display panel using the third sensor unit includes measuring the movement value of the display panel by measuring the number and movement direction of a plurality of grooves disposed on a rear side of the display panel using a third sensor and a fourth sensor.

14. The display control method of claim 11, wherein the determining of the cause of the error in the operation of the display panel includes:

determining whether an external force is sensed from an outside of the display panel;

sending a warning message for the external force when a determination is made that the external force is sensed from the outside of the display panel; and determining whether the external force is continuously sensed after sending the warning message for the external force.

15. The display control method of claim 14, wherein the determining of the cause of the error in the operation of the display panel includes determining a malfunction due to an internal defect of the display panel and sending a warning message for the internal defect when a determination is made that the external force is not sensed from the outside of the display panel.

16. A display device comprising:

a display panel;

a cylindrical member around which the display panel is rolled;

a third sensor unit configured to measure a movement value of the display panel;

a fourth sensor unit configured to measure a rotation value of the cylindrical member;

a fifth sensor unit configured to measure presence or absence of an external force transferred from an outside of the display panel; and a control unit configured to compare the movement value of the display panel measured by the third sensor unit with the rotation value of the cylindrical member measured by the fourth sensor unit to determine whether there is an error in an operation of the display panel, and determine a cause of the error in the operation of the display panel based on the external force measured by the fifth sensor unit.

17. The display device of claim 16, wherein the third sensor unit includes a third sensor and a fourth sensor disposed as a pair on a rear side of the display panel, and the third sensor and the fourth sensor measure a movement direction of the display panel and a movement distance of the display panel by measuring some or all of a plurality of grooves disposed at regular intervals in the movement direction of the display panel.

18. The display device of claim 16, wherein the fourth sensor unit is disposed on a slot disk coupled to one side of the cylindrical member, and measures the rotation value of the cylindrical member by counting slots of the slot disk.

19. The display device of claim 16, wherein the fifth sensor unit is disposed at an upper end of the display panel to measure presence or absence of an external force from an upward direction of the display panel or to measure presence or absence of an object located within a maximum exposure distance of the display panel.

* * * * *